Figure 1:
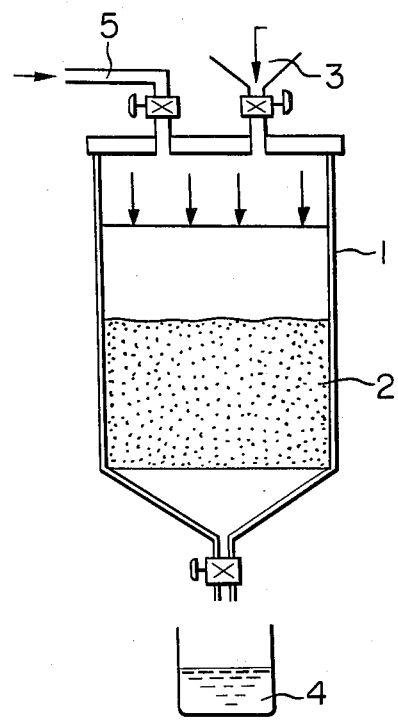

United States Patent [19]

Ohoka et al.

[11] 4,403,891
[45] Sep. 13, 1983

[54] STABILIZER FOR EXCAVATED SURFACE

[75] Inventors: Shinkichi Ohoka; Sakae Sano, both of Tokyo, Japan

[73] Assignees: Toa Grout Kogyo Co., Ltd.; Mitsui Toatsu Chemicals, Inc., both of Tokyo, Japan

[21] Appl. No.: 195,447

[22] Filed: Oct. 9, 1980

[51] Int. Cl.³ .............................................. E02D 3/12
[52] U.S. Cl. .................................... 405/264; 405/267
[58] Field of Search ................. 252/8.5 LC; 405/267, 405/264; 166/294; 162/DIG. 9

[56] References Cited

U.S. PATENT DOCUMENTS

| | | | |
|---|---|---|---|
| 2,119,829 | 6/1938 | Parsons | 252/8.5 |
| 2,691,629 | 10/1954 | Stoner | 252/8.5 |
| 2,749,308 | 6/1956 | Van Beckum | 252/8.5 |
| 2,793,995 | 5/1957 | Twining | 252/8.5 |
| 3,379,609 | 4/1968 | Roberts | 162/187 X |
| 3,788,405 | 1/1974 | Taylor | 175/72 |
| 3,811,488 | 10/1974 | Nestle et al. | 252/8.5 |
| 3,909,470 | 9/1975 | Lambuth et al. | 162/187 X |
| 4,063,386 | 12/1977 | Tamier | 405/264 X |
| 4,289,632 | 9/1981 | Clear | 252/8.5 |

*Primary Examiner*—Herbert B. Guynn
*Attorney, Agent, or Firm*—Jordan and Hamburg

[57] ABSTRACT

This invention relates to an improved stabilizer for excavated surface, and more particularly to a stabilizer for excavated surface which comprises adding at least one of natural cellulose fibers, particularly pulp, defibrated waste paper stock or their mixture to an ordinary stabilizer for excavated surface containing bentonite, etc. as the main component to be used for excavating the ground according to a fluid circulation system.

The stabilizer according to the present invention has a good membrane formation ability and good strengthening and reinforcement of the soil structure around the excavated surface and also has a high capacity of suspension and dispersion of the excavated muds and gravels.

1 Claim, 2 Drawing Figures

STABILIZER FOR EXCAVATED SURFACE

This invention relates to an improved stabilizer for excavated surface, and more particularly to a stabilizer for excavated surface which comprises adding at least one of natural cellulose fibers, particularly pulp, defibrated waste paper stock or their mixture to an ordinary stabilizer for excavated surface containing bentonite, etc. as the main component to be used for excavating the ground according to a fluid circulation system.

The present stabilizer has a distinguished membrane forming ability on an excavated surface and intensively takes part in reinforcement of soil near the excavated surface. The present stabilizer also has a distinguished capacity to suspend and disperse an excavated mud and gravels and ensures safer and more continued excavation in shield process or continued underground wall process.

Generally, the stabilizer for excavated surface (which may be also referred to as "stabilizer liquor" by those skilled in the art) stabilizes an excavated surface by a membrane formation on the excavated surface by means of the main component in the stabilizer, and suspends the excavated mud and gravels and transports and discharges the mud and gravels to the outside, thereby advancing the excavation in the shield process according to the fluid circulation system.

When the membrane formation on the excavated surface is the main object, in that case it is necessary to increase a concentration of stabilizer, whereas when the transportation and discharge of the mud and gravels is the main object, it is necessary to enhance the capacity of the stabilizer to suspend and disperse the mud and gravel. That is, it is necessary to lower the concentration of the stabilizer. Accordingly, there are problems in satisfying these two requirements, that is, the membrane formation ability and the capacity to transport and discharge mud and gravels at the same time. For example, when the concentration of the stabilizer, particularly, the main component is increased to obtain a good membrane formation ability, a larger amount of the main component is liable to precipitate, and the precipitated main component and excavated mud and gravel are accumulated at the bottom of the excavated location, and consequently transportation and discharge of the excavated mud and gravels by the stabilizer will be impossible to carry out. Thus, a lower concentration of the stabilizer is preferable for transportation and discharge of the excavated mud and gravels.

Furthermore, in the continued underground wall process according to a stabilizer circulation system, an excavated wall surface is stabilized by membrane formation on the excavated wall surface by means of the main component in a stabilizer, and exavated mud and gravels are suspended in the stabilizer, and transported and discharged to the outside by the stabilizer, thereby advancing the excavation.

Even in the continued underground wall process, as in the shield process, a higher concentration of the stabilizer is necessary for enhancing the membrane formation ability on an excavated wall surface, and also a higher capacity to suspend and disperse the excavated mud and gravels is necessary for better transportation and discharge of the excavated mud and gravels. However, the higher the concentration is, the more precipitated the main component of the stabilizer is. Thus, the transportation and discharge of the excavated mud and gravels to the outside will be difficult to carry out for the same reasons as mentioned above. In the continued underground wall process, a higher capacity to suspend and disperse the excavated mud and gravels is required for the stabilizer with increasing depth of a groove, and thus there will be a considerable discrepancy in concentration between the capacity to suspend and disperse the mud and gravels and the membrane formation ability.

As described above, the shield process as well as the continued underground wall process has problems in satisfying the membrane formation ability of stabilizers on the excavated surface and the capacity of stabilizers to transport and discharge the excavated mud and gravels at the same time.

As a result of extensive studies, the present inventors have found a stabilizer for excavated surface, which has such an improved membrane formation ability and such a good capacity to suspend and disperse the excavated mud and gravel as to eliminate the above-mentioned disadvantages in both shield process and continued underground wall process and furthermore can considerably reinforce and strengthen the soil structure around the excavated surface.

The gist of the present invention resides in a stabilizer for excavated surface which comprises adding at least one of natural cellulose fibers to an ordinary stabilizer to be used for excavating the ground according to a fluid circulation system, and the present invention provides a stabilizer for excavated surface suitable for the shield process and the continued underground wall process, which can attain a high membrane formation ability, reinforcement of soil around the excavated surface, and a high capacity at the same time to suspend and disperse the excavated mud and gravels by adding natural celloluse fibers to a stabilizer containing bentonite, etc. as the main component.

Any material can be used as the main component of the stabilizer in the present invention, so far as it is the one heretofor used, and in some cases excavated mud or slit having very similar properties to those of, for example, bentonite can be satisfactorily used as the main component, and the process of using such mud or slit as the main component is usually called "mud water process" by those skilled in the art.

The natural cellulose fibers to be added to the stabilizer for excavated surface according to the present invention is not particularly restricted to specific species, but pulp, defibrated waste paper stock or their mixture is preferably used.

Thus, the present invention will be described in detail below, referring to pulp and defibrated waste paper stock.

In the case of pulp preferably used for the stabilizer according to the present invention, any kind of pulp prepared according to any process can be used, but a bleached pulp is preferable to an unbeated pulp. In any case, a pulp having a high water retainability and a high swellability is preferably used.

Defibrated waste paper stock is particularly preferable, and in this case defibrated waste paper stock having a high degree of defibration, a high water retainability, and a high swellability is more preferably used.

Such pulp and defibrated waste paper stock swell very remarkably in water, and thus show a high water retainability. The amount of retained water is generally several times as large as the weight of pulp or defibrated waste paper stock. For example, the amount of water retained in one gram of defibrated waste paper stock obtained from semi-bleached, medium grade paper is 7.26 g.

Pulp or defibrated waste paper stock has such a high swellability and a higher water retainability as described above that is apparent specific gravity approaches that of water when dipped in water, and thus pulp or defibrated waste paper stock can has a higher capacity to be suspended in water, and thus can be very satisfactorily suspended.

Volume of the water-retained and swollen pulp or defibrated waster paper stock is very large, as compared with the volume in the dry state, and consequently its surface area is also so large that the main component of the stabilizer, for example, bentonite, etc. can be readily adsorbed onto the surface of the pulp or defibrated waste paper stock.

The natural cellulose fibers to be used in the present invention are not particularly restricted to specific species, as described above, but those having more similar behavior in water to that of the pulp or defibrated waste paper stock are more preferably used.

In the present stabilizer, much swollen natural cellulose fibers having adsorbed the main component take part in the membrane formation in addition to the so far known membrane formation by the main component, and thus the stability is increased in the membrane formation.

Furthermore, there is no water permeability due to the much swollen state, and thus a good water-impermeable membrane can be formed.

At the initial stage of membrane formation, swollen cellulose fibers enter into soil void from the excavated surface to form a layer with a difinite depth. Thus, the soil is strengthened and reinforced in that depth.

Good mebrane formation ability and good strengthening and reinforcement of the soil structure around the excavated surface, can be obtained with increasing amount of natural cellulose fibers, for example, pulp or defibrated waste paper stock, but the increase in the amount of pulp or defibrated waste paper stock consequently enhances the liquid viscosity of stabilizer, and above some viscosity it is difficult to circulate the stabilizer liquor, particularly to transport and discharge the mud and gravels by suspension and dispersion.

The natural cellulose fibers to be used in the present stabilizer has a very high capacity to be suspended and dispersed as described above, but the capacity is much dependent on its concentration. For example, at such a concentration that pulp or defibrated waste paper stock can be dispersed in water in a single fiber state, a satisfactory capacity to be suspended and dispersed can be obtained, but the increasing concentration will make it impossible to suspend and disperse each single fiber independently, and consequently the each independent single fiber is entangled with one another. Further increase in the concentration will eventually form a fiber layer where fibers of pulp or defibrated waste paper stock are entangled with one another in a highly state in water, and the capacity to be suspended and dispersed in gradually decreased.

That is, at a low concentration of such natural cellulose fibers, swollen single fiber having adsorbed the main component, for example, bentonite or mud particles, and the main component are suspended and dispersed independently in the liquor. However, at a higher concentration, particularly when the fiber layer is to be formed, the main component cannot pass through the layer substantially at all, since the fibers themselves are swollen, and the swollen fibers and the main component suspended and dispersed below the fiber layers are gradually attached to the bottom surface of the fiber layer as the fiber layer settles down. The apparent specific gravity is increased thereby and correspondingly the fiber layer settles down more rapidly.

Thus, the amount of natural cellulose fibers to be added is in a direct relationship in the present stabilizer. The relationships obtained according to a specific example using defibrated waste paper stock will be given below.

That is, defibrated waste paper stock is added to the ordinary stabilizer having the following composition to prepare various stabilizers having different concentrations of defibrated paper stock (concentrations based on the water ccontent of the above-mentioned stabilizer) and their viscosity and settling ability are measured. Results are shown in Table 1.

| Water | 300 cc |
|---|---|
| Bentonite | 30 g |
| CMC | 0.15 g |
| Foaming agent | 0.03 g |

The settling ability means a height of settlings in percentage on the basis of the height of total liquid, obtained by pouring the stabilizers having various degrees of defibrated waste paper stock shown in Table 1 into 500 cc measuring cylinders individually, followed by throughly stirring and standing for 30 minutes. The capacity to be suspended and dispersed can be indirectly obtained from the measurement of the settling ability.

TABLE 1.

| Run No. | Concentration of defibrated waste paper stock | Viscosity (cP) | Settling ability (%) |
|---|---|---|---|
| 1 | 0 | 8.5 | 40.00 |
| 2 | 0.08 | 10.5 | 39.81 |
| 3 | 0.12 | 10.0 | 38.40 |
| 4 | 0.40 | 25.0 | 37.18 |
| 5 | 1.0 | 140 | 53.90 |
| 6 | 1.3 | 330 | 60.13 |
| 7 | 2.0 | 650 | 81.25 |

In the result of Table 1, the settling ability in terms of the height of settlings is 40.00% in Run No. 1, that is, the case of 0% defibrated waste paper stock and 10% bentonite, whereas the settling ability is 39.8% in Run No. 2 (0.08% defibrated waste paper stock and 10% bentonite); 38.40% in Run No. 3 (0.12% defibrated waste paper and 10% bentonite), and 37.18% in Run No. 4 (0.4% defibrated waste paper and 10% bentonite), which are numerically not so different from that of Run No. 1, but the defibrated waste paper stock is added in the stabilizer in Run Nos. 2-4. The layer of settlings in Run No. 1 is not bulky (a high density) because the stabilizer contains only bentonite, whereas the layers of settlings in Run Nos. 2-4 are very bulky (a low density), because the stabilizers are contain swollen defibrated waste paper stock. The settling ability shown herein is determined from the height of the layer of settlings, and no difference in the settling ability is observed at a glance between Run No. 1 and Run Nos. 2-4, but the amount of settlings is substantially smaller in Run Nos. 2-4, and the capacity to be suspended and dispersed is larger, as compared with that of Run No. 1.

The settling ability is 53.90% in Run No. 5 (1.0% defibrated waste paper stock and 10% bentonite), 60.13% in Run No. 6 (1.3% defibrated waste paper and 10% bentonite) and 81.25% in Run No. 7 (2.0% defibrated waste paper and 10% bentonite), and their capacity to be suspended and dispersed seems to be numerically lower than that of Run No. 1 at a glance, but the amounts of defibrated waste paper stock added are larger, for example, 1.0% in Run No. 5, 1.3% in Run No. 6 and 2.0% in Run No. 7. That is, the amounts of defibrated waste paper stock in the layers of settlings are thus larger, and the layers are correspondingly bulky. Their capacity to be suspended and dispersed is still high, but a layer of swollen defibrated waste water stock is formed in the liquor with time, and thus there is a possibility of lowering in the capacity to be suspended and dispersed for the aforementioned reasons. Furthermore, their viscosity is 140 cP, in Run No. 5, 330 cP in Run No. 6, and 650 cP in Run No. 7, and particularly such a high viscosity as 330 cP and 650 cP produces a trouble in transportation and discharge of excavated mud and gravels.

Tables 2 and 3 show viscosity and settling ability obtained by changing the concentration of defibrated waste paper stock of the above-mentioned ordinary stabilizers each further containing 24 g or 12 g of bentonite in the same manner as described above.

TABLE 2.

| Run No. | Concentration of defibrated waste paper stock | Viscosity (cP) | Settling ability (%) |
| --- | --- | --- | --- |
| 8 | 0 | — | 32.00 |
| 9 | 0.4 | 24.5 | 32.70 |
| 10 | 1.0 | — | 47.00 |
| 11 | 1.3 | — | 55.19 |
| 12 | 2.0 | — | 75.50 |

In Table 2, the content of bentonite is 8%, and the capacity to be suspended and dispersed is naturally better in Run No. 9 than in Run No. 8 for the same reason as mentioned above with reference to Table 1, and a satisfactory capacity to be suspended and dispersed can be expected also in Run Nos. 10-12.

TABLE 3.

| Run No. | Concentration of defibrated waste paper stock | Viscosity (cP) | Settling ability (%) |
| --- | --- | --- | --- |
| 13 | 0 | — | 16.00 |
| 14 | 0.4 | 16.5 | 29.90 |
| 15 | 1.0 | — | 45.52 |
| 16 | 1.3 | — | 53.52 |
| 17 | 2.0 | — | 72.33 |

In Table 3, the content of bentonite is 4%, and the capacity to be suspended and dispersed is better in Run No. 14 than in Run No. 13, and the settling ability seems to be numerically larger in Run Nos. 15-17 at a glance, but their capacity to be suspended and dispersed is regarded as substantially still distiguished.

From the results of Tables 1, 2 and 3, it is apparent that the concentration of pulp or defibrated waste paper stock is preferably 0.1-3.0%, particularly preferably 0.1-0.4% in view of the viscosity.

The present stabilizer for excavated surface contains 0.1-3.0% of natural cellulose fibers, for basis of the water content of the stabilizer, and the membrane formation by the main component is intensively promoted by the swollen fibers, that is, by a high swellability and a high water retainability of the natural cellulose fibers, and at the same time the water permeability of the resulting membrane is much lowered. The swollen fibers enter into the void of the excavated surface at the initial stage of membrane formation, and a layer of definite depth is formed, whereby the strengthening and reinforcement of the excavated surface can be attained. Furthermore, the excavated mud and gravels can be readily transported and discharged to the outside owing to the high capacity to suspended and disperse the excavated mud and gravels.

Lowering of water permeability by the present stabilizer for excavated surface, that is, the action to prevent water loss of the excavated surface and the strengthening and reinforcement of soil structure around the excavated surface, will be further explained in detail below, referring to a stabilizer for excavated surface which contains defibrated waste paper stock.

To attain the foregoing object, an apparatus shown in FIG. 1 is used. That is, a definite amount of sands 2 having a diameter of about 5 mm is filled in a transparent pressure-resistant glass pipe 1, and a stabilizer for excavated surface consisting of mud water is supplied into the pipe at a sample inlet 3. the mud water immediately passes through the filled sand layer and reaches a beaker 4 outside the pipe.

Figure 2:
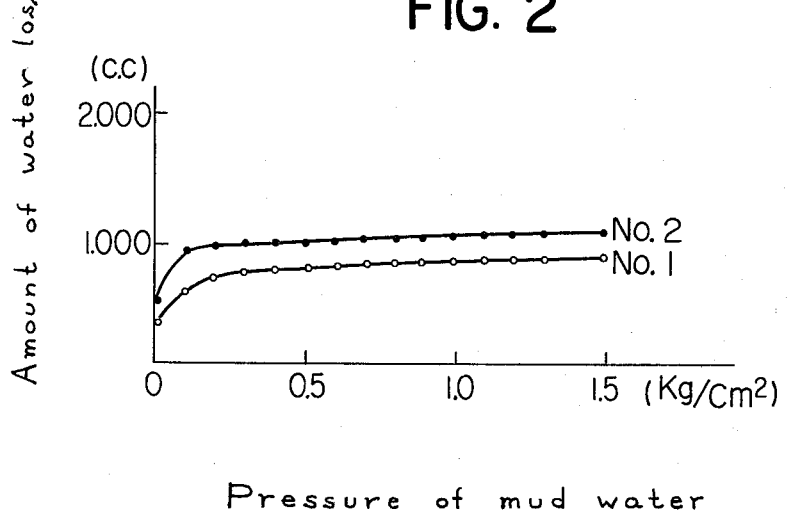

On the other hand, a stabilizer for excavated surface according to thhe present invention, that is, a sample containing defibrated waste paper stock in the above-mentioned ud water, is supplied to the pipe, and air is supplied to the pipe at a conduit 5 to pressurize the pipe inside, whereby relationships between the amount of water loss and the mud water pressure as shown in FIG. 2 can be obtained.

In FIG. 2, relationships between the amount of water loss and the mud water pressure for a definite time are shown for No. 1, where 0.5% of defibrated waste paper stock is added on the basis of the water content of the liquor, and for No. 2, where 0.3% of defibrated waste paper stock is added on the basis of the water content of the liquor. It is obvious from No. 1 that after arriving at a mud water pressure of 0.5 kg/cm$^2$, no water loss is observed thereafter, and from No. 2, that no water loss is observed after arriving at a mud water pressure of 0.5 kg/cm$^2$.

It is seen from the foregoing fact that membrane formation by the present stabilizer for excavated surface is clearly observed at the excavated surface, and furthermore the packed sand 2 is not disintegrated at all even by laying the glass pipe to a horizontal position in both No. 1 and No. 2. It is observed that a rigid layer is formed near the surface of sand 2 by the defibrated waste paper stock.

Furthermore, the mud and gravels transported and discharged by the circulation of the stabilizer liquor for excavated surface and classified into gravels, sand and fine mud, and the gravels and sand are utilized for their specific purposes, whereas in the most cases the mud is separated from the liquor and thrown away.

The separated mud contains much water, and even after the mud is intensively squeezed and dehydrated, for example, by a filter press, etc., excess water still drops down from the sand, and thus even if such mud is transported to other place and thrown away, the water still contained in the mud drops down during the transportation. Its transportation is thus prohibited from the viewpoint of environmental pollution.

However, the water-containing fine mud to be discharged to the outside by the circulation of the present stabilizer liquor for excavated surface and thrown away is further admixed with natural cellulose fibers for example, pulp or defibrated waste paper stock, and the excess droppable water in the water-containing mud can be retained by the admixed pulp or defibrated waste paper stock. Thus, the mud can be transported.

That is, it is well known that the excavated mud can be generally utilized as the main component of the stabilizer for excavated surface, and the excavated mud can swell and retain water as the main component in the similar manner to that of the typical bentonite, etc. For example, the amount of water retainable in 10 g of bentonite is 7.34 g, which corresponds to a water content of 42.3%. Above that water content, excess water naturally starts to drop down from the water-containing bentonite.

On the other hand, for example, pulp or defibrated waste paper stock has a very high swellability. For example, an amount of water retainable in 1 g of defibrated waste paper stock obtained from semi-bleached, medium grade paper is 7.26 g, whick corresponds to a water content of 87.9%. That is, the defibrated waste paper stock has a water retainability which is about 10 times as high as that of bentonite.

Suppose, 14.60% of water (7.34 g+7.26 g) is contained in 10 g of bentonite in the foregoing case, water cannot be, of course, retained in bentonite, and theoretically 7.26 g of water drops down to the outside. However, when 1 g of the defibrate waste paper stock is added to the water-containing bentonite in such a state, the defibrated waste paper stock can absorb and retain 7.26 g of the excess water, and accordingly water never drops down from 10 g of bentonite to the outside.

As described above, the fine mud to be discharged from the stabilizer liquor used in the shield process or continued underground wall process still contains excess droppable water even after squeezing dehydration, but the excess water can be absorbed in only a small amount of the added pulp or defibrated water paper stock, and retained in the mud.

Thus, the discharged mud containing pulp or defibrated waste paper stock has no fear of water dropping and consequent environmental pollution when it is transported to other places.

Furthermore, such discharged mud can be reused as the present stabilizer for excavated surface by adjusting the discharged mud.

On the other hand, the ground stabilizer containing the pulp, or defibrated waste paper stock, particularly the latter, is gelled when injected into the ground, and at the same time, the defibrated waste paper stock is entangled to produce a reticular, three-dimensional structure, and the dynamic water rate of spring water or leakage can be reduced thereby, and not only the similar effect to that in the static water ground can be obtained, but also appearance of the bleeding phenomenon can be much suppressed owing to the high hydration and water retainability of defibrated waste paper stock.

The ground stabilizer containing such pulp or defibrated waste paper stock is particularly suitable as a back-filling material which can back-fill the outbreak holes or void as rapidly as possible when materials are buried after underground excavation such as tunnel work, etc. That is, it is obvious from the foregoing that such a ground stabilizer is a distinguished back-filling material capable of preventing bleeding, leakage from buried materials, leakage into the ground, etc.

The mud retaining excess water owing to the admixed pulp or defibrated waste paper stock can be dried to powder for a convenience of transportation to a remote place, or the resulting powder can be sold as an additive to the ordinary ground stabilizer.

What is claimed is:

1. The process for stabilizing an excavated surface to provide good membrane formation ability therein and good strengthening and reinforcement of the soil structure adjacent to said surface, comprising adding to said excavated surface a stabilizer consisting of 300 parts by weight of water, 0.1 to 3.0% by weight of highly hydrated beaten natural cellulose fibers, based on the water content of the stabilizer, bentonite, a foaming agent and carboxymethylcellulose.

* * * * *